United States Patent
Ito

(10) Patent No.: US 7,107,064 B2
(45) Date of Patent: Sep. 12, 2006

(54) MOBILE COMMUNICATION DEVICE AND METHOD FOR DETERMINING WHETHER TO TRANSMIT POSITION DATA

(75) Inventor: Toshiyuki Ito, Toyohashi (JP)

(73) Assignee: DENSO Corporation, Kariya (JP)

( * ) Notice: Subject to any disclaimer, the term of this patent is extended or adjusted under 35 U.S.C. 154(b) by 378 days.

(21) Appl. No.: 10/245,553

(22) Filed: Sep. 16, 2002

(65) Prior Publication Data

US 2003/0054840 A1   Mar. 20, 2003

(30) Foreign Application Priority Data

Sep. 18, 2001   (JP)   ............................. 2001-283606

(51) Int. Cl.
*H04L 12/42*   (2006.01)
(52) U.S. Cl. ............................. 455/456.1; 455/456.2; 455/411; 455/404.2
(58) Field of Classification Search ................ 340/989; 455/414.1, 456.1–457, 410, 411, 404.1, 404.2
See application file for complete search history.

(56) References Cited

U.S. PATENT DOCUMENTS

| | | | | |
|---|---|---|---|---|
| 5,594,425 A | * | 1/1997 | Ladner et al. ......... | 340/825.49 |
| 5,914,675 A | * | 6/1999 | Tognazzini ................ | 340/989 |
| 6,138,003 A | * | 10/2000 | Kingdon et al. ............ | 455/410 |
| 6,311,069 B1 | * | 10/2001 | Havinis et al. .......... | 455/456.4 |
| 6,385,458 B1 | * | 5/2002 | Papadimitriou et al. . | 455/456.2 |
| 6,505,048 B1 | * | 1/2003 | Moles et al. ............. | 455/456.1 |
| 6,643,516 B1 | * | 11/2003 | Stewart ................... | 455/456.6 |
| 6,687,504 B1 | * | 2/2004 | Raith ....................... | 455/456.1 |
| 2003/0008672 A1 | * | 1/2003 | Fujii ........................ | 455/456 |
| 2004/0157588 A1 | * | 8/2004 | Stepman et al. ......... | 455/414.1 |

FOREIGN PATENT DOCUMENTS

| | | |
|---|---|---|
| JP | 03-210756 | 9/1991 |
| JP | A-3-201756 | 9/1991 |
| JP | 06-232962 | 8/1994 |
| JP | A-6-232962 | 8/1994 |
| JP | 09-054881 | 2/1997 |
| JP | 10-164643 | 6/1998 |
| JP | 2000-217141 | 8/2000 |
| JP | 2001-148737 | 5/2001 |
| JP | 2001-218250 | 8/2001 |

* cited by examiner

*Primary Examiner*—Lester G. Kincaid
*Assistant Examiner*—Marisol Figueroa
(74) *Attorney, Agent, or Firm*—Harness, Dickey & Pierce, PLC

(57) ABSTRACT

A mobile communication device and other users form a communication network along with a position search server. When a position search request from the user terminal is sent through the position search server, the mobile communication terminal determines the urgency level of that search request by referring to a telephone book having preset urgency levels. The mobile communication device automatically sends its own position data to the requesting source in response to high urgency levels such as tracing a stolen vehicle, and automatically sends its own position data or stands by for terminal user approval as required in response to low urgency level—high priority requests.

12 Claims, 4 Drawing Sheets

_MOBILE COMMUNICATION DEVICE AND METHOD FOR DETERMINING WHETHER TO TRANSMIT POSITION DATA_

CROSS REFERENCE TO RELATED APPLICATION

This application is based on and incorporates herein by reference Japanese Patent Application No. 2001-283606 filed on Sep. 18, 2001.

FIELD OF THE INVENTION

The present invention relates to a mobile communication terminal device and method for use in systems capable of determining whether to transmit position data or not according to the urgency level of a position search request for mobile communication terminal position data sent from a position search server.

BACKGROUND OF THE INVENTION

Recently services are available for discovering stolen vehicles by utilizing the vehicle position information in GPS (Global Positioning System) for mobile communication devices. In other words, when for example, a request is made to the service center by a vehicle owner whose automobile was stolen, a telephone call is promptly made from the service center to the stolen vehicle instructing that position data be sent. The vehicle swiftly responds to the instruction from the service center and unknown to the thief, sends back position data to the service center.

However, when functions or service of this type are applied not only to tracking stolen vehicles but to general position search services such as for exchange of position data in vehicle-to-vehicle communication or finding the position of terminal users (elderly people, etc.) utilizing PHS, then a stranger may learn the terminal user's position without the knowledge of that terminal user. This creates the potential for invasion of privacy and so on.

SUMMARY OF THE INVENTION

The present invention has the object of providing a mobile communication terminal device and method that, when required, sends its own position data to a requesting source while maintaining both urgency and secrecy and is capable of refusing to transmit to the requesting source.

According to the present invention, a mobile communication device receives a position search request through a communication network, and determines an urgency level of a position search request received from a requesting station. The device sends a position data to the requesting station, when it is determined that the urgency level is high. It also sends the position data to the requesting station, when a user enters an approval instruction although the urgency level is low.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT (First Embodiment)

Figure 1:
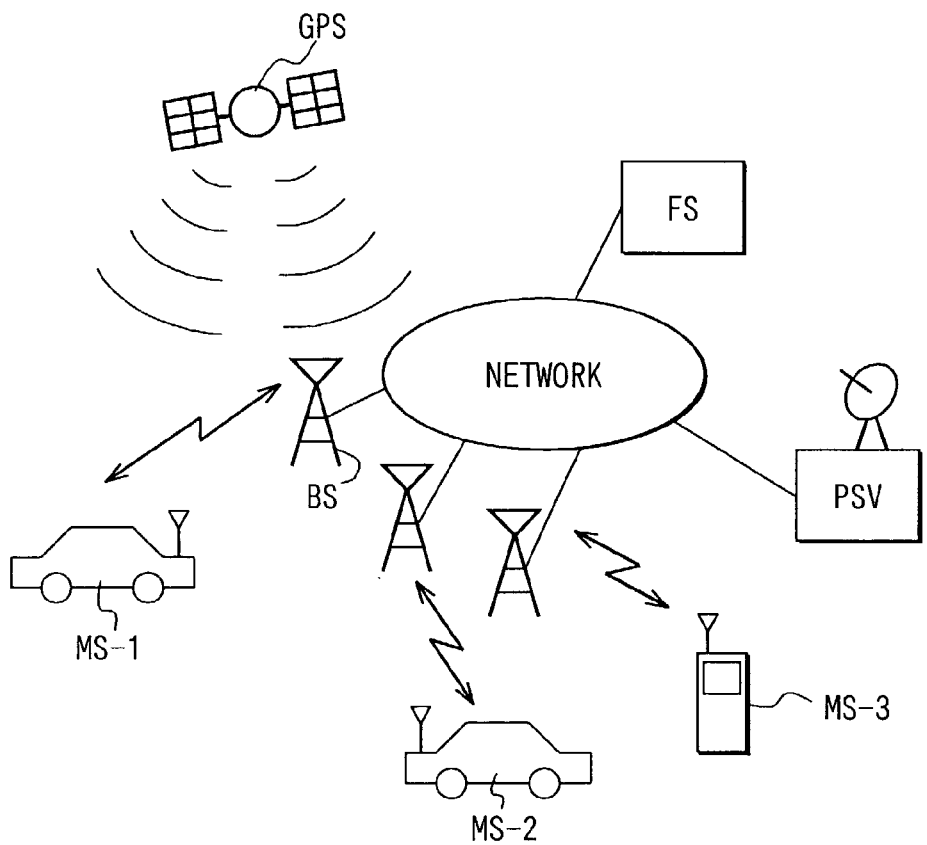
FIG. 1 is a schematic view showing a communication system.

The overall communication system (communication network) used by a mobile communication terminal device according to the first embodiment is shown in FIG. 1.

A mobile communication terminal MS (MS-1 to MS-3) communicates with each base station BS connected to the network made up of car telephones, car navigation devices with communication functions, and cellular telephones (MS-1, MS-2, MS-3, etc.). The network is also connected to fixed stations for example, subscriber telephones. Communication is performed between the mobile communication terminal MS and fixed stations FS. The mobile communication terminal device MS and fixed stations FS for communication are hereafter called by the general term "station". The mobile communication terminal device MS is called a mobile terminal MS or simply terminal MS.

The mobile communication terminal MS is capable of receiving GPS (Global Positioning System) signals, calculating the present position based on the GPS signals, storing the calculated position data in its position data memory and showing a map on its display. A position search request is sent on the network to the terminal MS based on a request from another station (mobile communication terminal, cellular telephone, fixed station, etc.). The position search server PSV also connected to the network receives position data from the terminal MS or refuses to receive data.

Along with the position data being calculated by the terminal MS from the GPS signals for use on a CDMA (Code Division Multiple Access) communication network, the GPS signals received by the terminal MS and base station information may be sent to a dedicated positioning calculation station. The dedicated positioning calculation station calculates the position based on information from the terminal MS. The terminal MS then may once again acquire those calculated results from the dedicated positioning calculation station.

The position data of a base station for communication can itself be utilized as position data for expressing adjacent information of a terminal position as in a PHS (Personal Handyphone System) network. The position data indicating the current position of the invention therefore also includes not only the current position of the mobile communication terminal device but also adjacent information (information of a nearby position adjacent to the current position).

Figure 2:
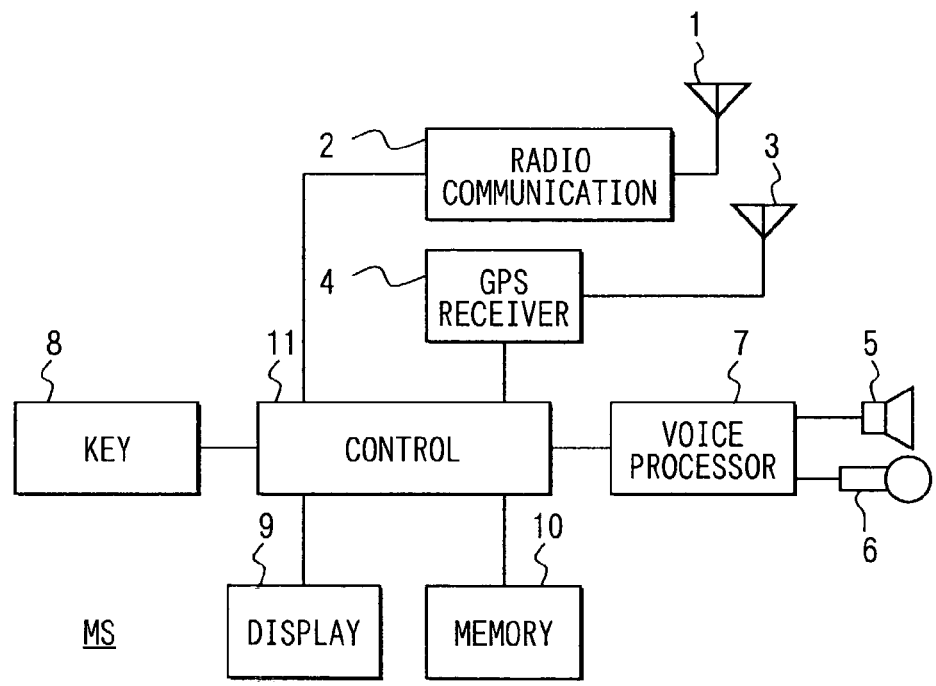
FIG. 2 is a block diagram showing a mobile communication terminal device according to an embodiment of the present invention.

The mobile communication terminal MS shown in the block diagram of FIG. 2 is made up of a communication antenna 1 and a radio communication section 2 for communicating with base stations BS, a GPS antenna 3 and a GPS receiver section 4 for receiving signals from the GPS satellite, a speaker 5 for voice interface with the terminal user, a microphone 6 and a voice processor 7, a key panel 8 as an input device for entering user operating instructions, a display 9 for showing various information to the terminal user, a memory 10 to store data such as program and position data and a telephone book, and a control section 11 to run programs and control each section. Here, the key panel 8 may be utilized as a touch panel type key panel in the display 9. Also, one antenna may be jointly used as the communication antenna 1 and the GPS antenna 3.

Figure 3:
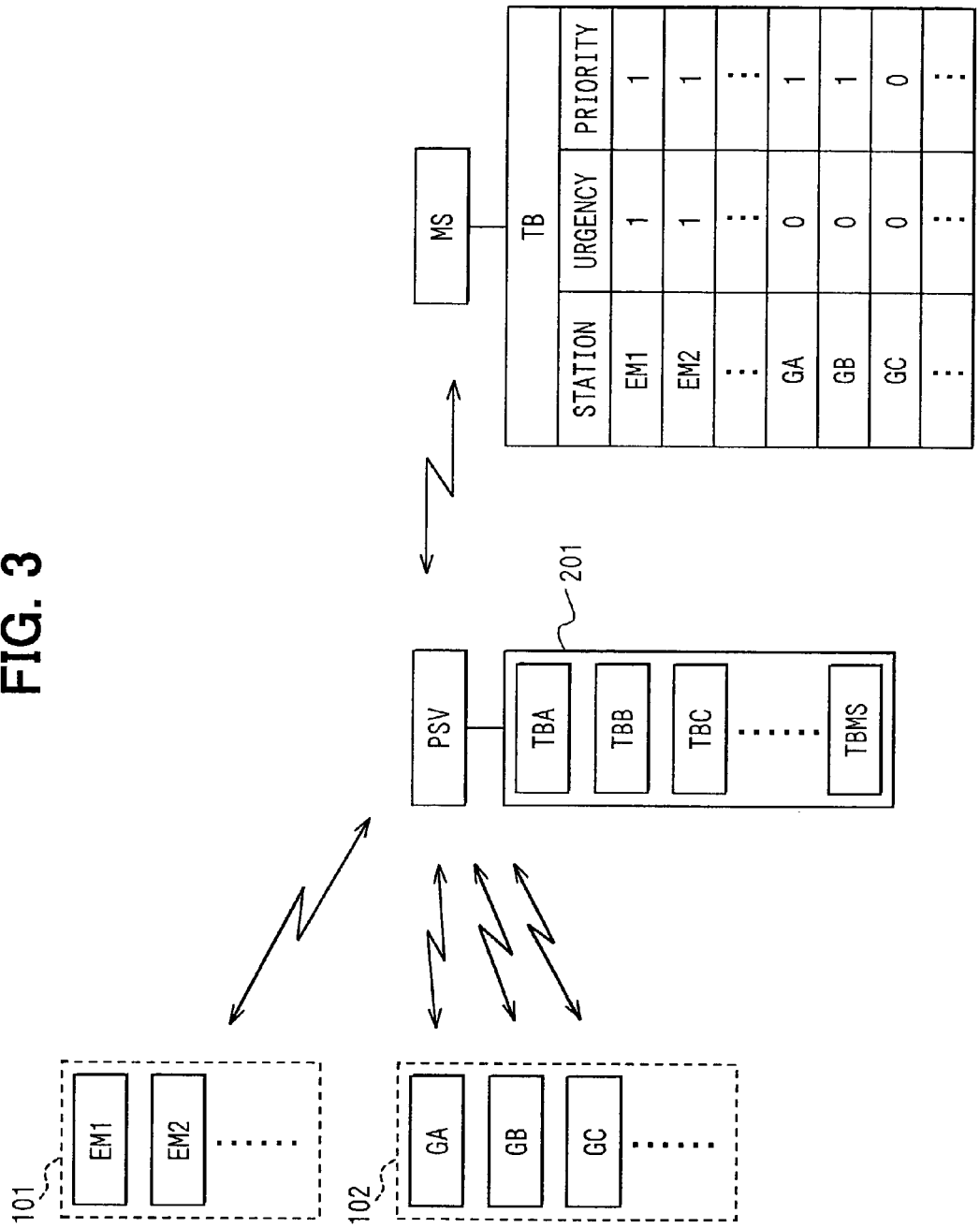
FIG. 3 is a diagram showing the interrelation of the mobile communication terminal device, a position search server and other stations in the communication system shown in FIG. 1.

The above mobile communication terminal MS of the embodiment is configured as a car navigation device. The interrelation of the mobile communication terminal MS of the embodiment, the position search server and other stations is shown in FIG. 3. The other stations are set by each terminal user. A group 101 consists of urgent (emergency) users that are granted tracking service facilities for stolen vehicles or are terminal users receiving special urgent (emergency) handling. A group 102 consists of general users GA, GB, GC having a relatively low urgency level. Each respective station makes a position search request to the position search server PSV through the network.

In this embodiment, the position search request for a tracking service for stolen vehicles is for example, sent from the urgent user EM1 independent of the position search server PSV. However, a configuration may also be used where the position search server PSV itself makes the request. In such a case, the urgency level relating to the position search server is set in the telephone book TB of the terminal MS.

The terminal users set beforehand, the desired user urgency level and priority level as relating to other communicating stations (groups 101 and 102) into the telephone book TB of the terminal MS. In the example of FIG. 3, the urgency users EM1, EM2 are both respectively set to urgency level 1 (high) and priority level 1 (high). The general user GC is set to urgency level 0 and priority level 0. An identification number such as a telephone number is stored for the station names in the figure (in actual operation). Due to the purpose of urgency user group 101, the users there are set beforehand to a high urgency level.

By first setting the urgency flag at each terminal as shown in the figure, and sending it to the position search server PSV, the telephone books TBA, TBB, TBC, . . . for each terminal are gathered in telephone book 201 as the original data to give in the position search request at position search server PSV. The urgency level information received in the position search request is given to the terminal MS as described later on so that the urgency level information in the MS telephone book is not utilized for determining (checking) the urgency level.

The position search server PSV receives the position search request from each user (station), searches the telephone book 201, applies an urgency flag "1" to position search requests from stations with a high urgency level, and along with attaching an identification number (telephone number, etc.) to the station issuing the request, transmits it (flag and telephone number) to the applicable mobile communication terminal MS.

Figure 4:
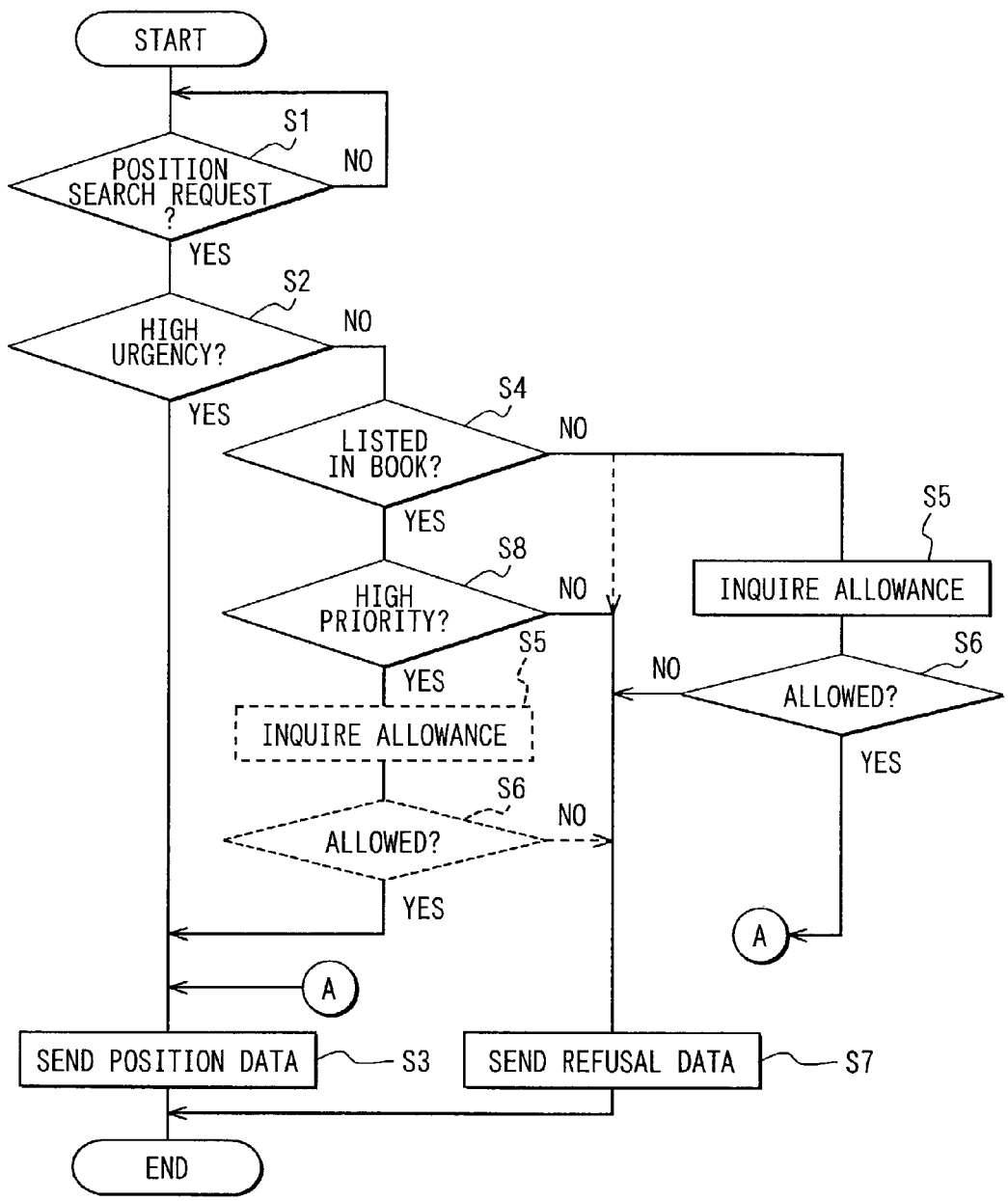
FIG. 4 is a flowchart showing response processing for a position search request in the mobile communication terminal device shown in FIG. 2.

The mobile communication terminal MS on the other hand, operates according to the flowchart shown in FIG. 4. Steps in FIG. 4 that can be changed are indicated by a dashed line.

When the terminal MS awaiting a message receives the position search request from the position search server PSV (step 1), a check is made if an urgency flag has been attached to that position search request showing a high urgency category or low urgency category (step 2). If an urgency flag "1" is raised, then the urgency level is high. The current position information stored in the memory section 10 is addressed to the station that sent the request, and sent to the position search server PSV (step S3).

When the request category in step 2 is low, or in other words when it is determined that the urgency level is low, a check is made if the requesting station is listed in the preset telephone book TB (step 4). When the station making the request in step is not listed in the telephone book TB, it is notified to the terminal user by the display 9 or the speaker 5 that the position search request has been made along with the name of the station making the request. It is inquired if the user allows or refuses to send position data (step 5). If the user enters "ALLOW" on the key panel 8, the process shifts to step S3. If the user enters "REFUSE", then refusal data indicating the position search request is refused is sent. If there is no key entry after a fixed amount of time elapses, then this lack of response is seen as a request refusal and refusal data is sent.

Simultaneous with performing the check process in step S6, the check result is rewritten in the telephone book TB. In other words, if the station making the request is a new station not listed in the telephone book TB, then that station is first of all newly added to the telephone book TB. Then, if processing result in step S6 for the station listed in the telephone MS are "ALLOW", a priority level 1 is set. If the check result is "REFUSE", a priority level 0 is reset. The latest intent of the terminal user can in this way be reflected by rewriting the telephone book TB.

In step S4, when the station making the request is not listed in the telephone book TB, the telephone book TB is searched in step S8 and a check is made if the priority level of the requesting station is high or not. In the example in FIG. 3, if the station making the request is user GA, the priority level is 1 so the process shifts to step S3 and the position data is sent. By checking the priority level of other stations preset in the telephone station MS, position data can automatically be sent or processing executed to refuse the request according to the urgency level and priority level, even if there are position search requests from various stations. There is therefore no interference with the vehicle driving of the terminal user in the case of vehicle-mounted mobile communication terminals.

In step S4, when the station making the request is not listed in the telephone book TB, the process may promptly shift to step S7 and the refusal data may be sent without causing any annoyance to the terminal user.

In step S8, even when the priority level of the station making the request is 1 (high), the process shifts to steps S5, S6. Here the changing terminal user requests can be handled in detail by making an ALLOW/REFUSE inquiry to the terminal user.

Therefore, the position search server PSV can attach urgency information to a position search request from another station (station sending the request) seeking to acquire position data on a mobile communication terminal and send the urgency level information to the terminal. The terminal can then determine the urgency level just by checking the urgency level information sent in response to the position search request, and the position data or refusal data can then be reliably and automatically sent according to the urgency level.

The priority level of other stations that might communicate with the terminal can be set beforehand into the telephone book TB. By then referring to this priority level, whether to allow or refuse the sending of position data matching the terminal user's request can be determined for position requests from stations with relatively low urgency level, without unconditionally sending position data to a party the terminal user does not want to notify (alert).

The telephone book TB can be rewritten based on results from the allow/refuse inquiry sent to the terminal user so that a most updated response can be made to the changeable requests from the terminal user.

(Second Embodiment)

Figure 5:
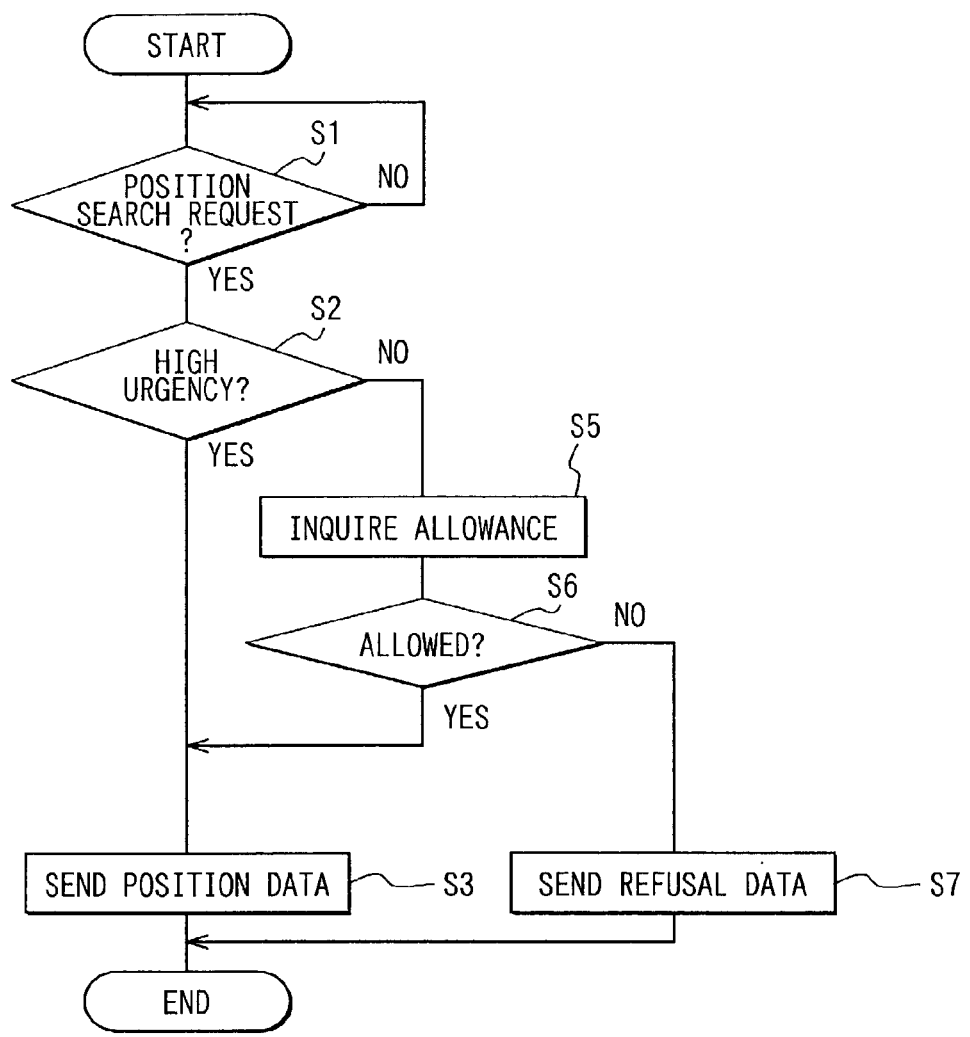
FIG. 5 is a flowchart showing another response processing for a position search request in the mobile communication terminal device shown in FIG. 2.

The mobile communication device of the second embodiment allows transmission of position data based only on the urgency information attached to the position search request and does not have a telephone book such as described in the first embodiment. The transmission of position data is further allowed or refused according to the request of the terminal user even when the urgency level is low and the position data is not sent immediately. The flowchart in FIG. 5 has the same reference numerals as the identical steps of the first embodiment only different sections (from the first embodiment) are described.

When the category of the request is low, in other words when it is determined that the urgency level is low, the process proceeds to step S5 based on urgency information attached to the position search request in step S2. Here, along with notifying the terminal user by the display 9 or the speaker 5 of the position search request and the name of the station making the request, an inquiry is made as to whether the user allows or refuses to send data.

In the second embodiment, as in the first embodiment, the position search server attaches urgency level information to the position search request sent from another station (station making the request) to acquire the position data on the mobile communication terminal. The terminal can then determine the urgency level just by checking the urgency level information sent in response to the position search request, so that position data or refusal data can reliably and automatically be sent according to the urgency level.

Also in the second embodiment, an inquiry can be made to the terminal user as to whether to allow or prohibit (transmit of position data) when the urgency level of the station making the request is low, so that a detailed response can be made to the changeable terminal requests. The second embodiment therefore does not need to utilize a telephone book of preset urgency levels for priority levels when determining whether to allow or refuse transmission of position data in response to a position search request from other stations.

(Other Embodiments)

As an alternative to the first embodiment, telephone books can be collected by the position search server from the terminals and may even be stored in the position search server PSV. In other words, the telephone books set with information relating to the urgency levels and priority levels of each terminal may all be stored in the telephone book 201 of the position search server PSV shown in FIG. 3. By then searching this kind of telephone book 201, the position search server PSV can attach not only urgency level information (urgency flag) but also priority level information (priority flag) to the position search request and send it to the appropriate mobile communication terminal.

In this case, the terminal MS processing can be implemented by changing a portion of the flowchart of FIG. 4 as follows. When the urgency level of the received position search request is high (urgency flag=1), the procedure of S2 to S3 may be implemented. When the urgency level is not high (urgency flag=0) and the priority level is high (priority flag=1), the procedure of S2 to S8 (S5 to S6) to S3 may be implemented (Steps S5 to S6 can be omitted). When neither the urgency level or priority level are high (urgency flag=priority flag=0), then the procedure S2 to S8 to S7 or the procedure S2 to S8 to S5 to S6 to S3 (or S7) may be implemented to obtain the same effect as the above embodiments.

As another embodiment, the evaluation criteria for the urgency level 1 or 0 and a priority level 1 or 0 set in the terminal MS may have a three-stage rating of high-medium-low for the urgency level (or priority level). In this case, if in the flowchart of FIG. 4, a procedure of S2 to S3 is implemented for a large urgency level, a procedure S4 to S8 (S5 to S6) to S3 (Steps S5 to S6 can be omitted) is implemented for a medium urgency level. When the procedure of S4 to S8 to S7 is implemented for a small urgency level, then the same effect as the above embodiments can be obtained. The telephone books set with the above 3-stage urgency information may be collected from each terminal and stored in the position search PSV. When a position search request is made to a terminal, the position search PSV may search these telephone books and attach the large-medium-small urgency information.

The above embodiments also described an example where the position search PSV attaches urgency level information to the position search request. However, base stations (users) can attach urgency level information (urgency flag) and transmit the position search request to the terminal MS, and the terminal MS can check the urgency level by the presence (or absence) of an urgency flag and automatically transmit position data for position search requests having an urgency flag. Therefore, the position search server PSV can send the position search request unchanged to the terminal MS or the position search PSV can itself be omitted from the network. In this case, the terminal MS preferably check the urgency level by using the telephone book TB.

Also, when making or changing urgency level settings, the terminal user preferably enters a code number along with the station number and urgency level settings. As methods to make changes to the telephone book within the terminal, telephone book changes may be made on the Web and downloaded over the network to the desired terminal MS.

In another embodiment, unlike the above embodiments, the terminal MS does not attach urgency information to the position search request that was received. Instead the terminal MS may collates (matches) the telephone number of the station making the request with the telephone book TB of the terminal MS as shown in FIG. 3, and may then determine (check) the urgency level based on the urgency level information set in the telephone book TB.

What is claimed is:

1. A mobile communication terminal device for communication with a communication network comprising:
   radio communication means for communicating by radio with the communication network;
   a position data memory for storing position data indicating a current position;
   input means for a user to enter instructions;
   determination means for deciding an urgency level of a position search request received by the radio communication means from the communication network;
   control means for sending the position data to a station making the position search request without an approval instruction from the input means when the determination means determines the urgency is high and sending the position data to the station in response to the approval instruction from the input means when the determination means determines the urgency level is low;

a telephone book memory for storing preset telephone numbers of other stations and priority level information related to the preset telephone numbers; and requesting station determination means for determining whether telephone number of the requesting station determined to have a low urgency level is contained in the telephone book memory, wherein the control means sends the position data to the requesting station, when determined by the determination means that the telephone book memory does not contain the telephone number but the user enters an approval instruction by the input means.

2. A mobile communication terminal device as in claim 1, wherein:

the radio communication means receives urgency level information indicating the urgency level of the position search request; and the control means determines the urgency level of the position search request based on the urgency information.

3. A mobile communication terminal device for communication with a communication network comprising:

radio communication means for communicating by radio with the communication network;

a position data memory for storing position data indicating a current position;

input means for a user to enter instructions;

determination means for deciding an urgency level of a position search request received by the radio communication means from the communication network;

control means for sending the position data to a station making the position search request without an approval instruction from the input means when the determination means determines the urgency is high and sending the position data to the station in response to the approval instruction from the input means when the determination means determines the urgency level is low;

a telephone book memory for storing preset telephone numbers of stations; and requesting station determination means for determining whether a telephone number of the requesting station determined to have the low urgency level is contained in the telephone book memory, wherein the control means sends the position data to the requesting station when the determination means determines the telephone number is contained in the telephone book memory, and wherein the control means sends the position data to the requesting station, when the determination means determines that the telephone number is not contained in the telephone book memory but the user enters an approval instruction by the input means.

4. A mobile communication terminal device for communication with a communication network comprising:

radio communication means for communicating by radio with the communication network;

a position data memory for storing position data indicating a current position;

input means for a user to enter instructions;

determination means for deciding an urgency level of a position search request received by the radio communication means from the communication network;

control means for sending the position data to a station making the position search request without an approval instruction from the input means when the determination means determines the urgency is high and sending the position data to the station in response to the approval instruction from the input means when the determination means determines the urgency level is low;

a telephone book memory for storing preset telephone numbers of other stations and priority level information related to the preset telephone numbers; and requesting station determination means for determining whether the telephone number of the requesting station determined to have the low urgency level is contained in the telephone book memory, wherein the control means sends the position data to the requesting station, when determined by the determination means that the telephone book memory contains the telephone number and that information with a high priority level is contained in the telephone book memory.

5. A mobile communication terminal device for communication with a communication network comprising:

radio communication means for communicating by radio with the communication network;

a position data memory for storing position data indicating a current position;

input means for a user to enter instructions;

determination means for deciding an urgency level of a position search request received by the radio communication means from the communication network;

control means for sending the position data to a station making the position search request without an approval instruction from the input means when the determination means determines the urgency is high and sending the position data to the station in response to the approval instruction from the input means when the determination means determines the urgency level is low;

a telephone book memory for storing preset telephone numbers of other stations and priority level information related to the preset telephone numbers; and requesting station determination means for determining whether the telephone number of the requesting station determined to have the low urgency level is contained in the telephone book memory, wherein the control means sends the position data to the requesting station, when the user enters an approval instruction by the input means under a condition that the telephone book memory contains a low priority level of the telephone number of the requesting station.

6. A mobile communication terminal device as in claim 1, wherein the communication network comprises a base station, the position search request being sent to the mobile communication terminal device by the base station.

7. A mobile communication terminal device as in claim 3, wherein:

the radio communication means receives urgency level information indicating the urgency level of the position search request; and the control means determines the urgency level of the position search request based on the urgency information.

8. A mobile communication terminal device as in claim 3, wherein the communication network comprises a base station, the position search request being sent to the mobile communication terminal device by the base station.

9. A mobile communication terminal device as in claim 4, wherein:

the radio communication means receives urgency level information indicating the urgency level of the position search request; and the control means determines the urgency level of the position search request based on the urgency information.

10. A mobile communication terminal device as in claim 4, wherein the communication network comprises a base station, the position search request being sent to the mobile communication terminal device by the base station.

11. A mobile communication terminal device as in claim 5, wherein:

the radio communication means receives urgency level information indicating the urgency level of the position search request; and the control means determines the urgency level of the position search request based on the urgency information.

12. A mobile communication terminal device as in claim 5, wherein the communication network comprises a base station, the position search request being sent to the mobile communication terminal device by the base station.

* * * * *